United States Patent [19]

Kenney et al.

[11] 3,769,507
[45] Oct. 30, 1973

[54] DYNAMIC RADIOGRAPHY
[75] Inventors: Edward S. Kenney; Alan M. Jacobs, both of State College, Pa.
[73] Assignee: Research Corporation, New York, N.Y.
[22] Filed: Aug. 25, 1971
[21] Appl. No.: 174,739

[52] U.S. Cl.............. 250/52, 250/43.5 D, 250/51.5, 250/71.5 S, 250/83.3 D, 250/106 T
[51] Int. Cl. ........................................... G01n 23/00
[58] Field of Search................ 250/43.5 D, 43.5 FC, 250/49.5 B, 49.5 ED, 51.5, 52, 61, 71.5 S, 83.3 D, 106 T

[56] References Cited
UNITED STATES PATENTS

| 2,476,150 | 7/1949 | Koppius | 250/105 |
|---|---|---|---|
| 3,183,351 | 5/1965 | White | 250/43.5 |
| 3,470,372 | 9/1969 | Bayly | 250/43.5 |
| 3,659,103 | 4/1972 | Cassen | 250/71.5 |
| 3,422,264 | 1/1969 | Martina | 250/61 |
| 2,997,586 | 8/1961 | Scherbatskoy | 250/71.5 |
| 3,361,911 | 1/1968 | Kowalczynski | 250/83.3 |
| 3,376,415 | 4/1968 | Krogstad et al. | 250/51.5 |
| 3,585,387 | 6/1971 | Bramlet | 250/71.5 |

OTHER PUBLICATIONS

"Ultrasonic Treatment of Specimens in the Electron Microscope" by B. Langenecker from The Review of Scientific Instruments Vol. 37, No. 1, Jan. 1966, pages 103–106.

Primary Examiner—William F. Lindquist
Attorney—Robert S. Dunham et al.

[57] ABSTRACT

A dynamic radiography system for examining an optically opaque object containing radiation scattering centers by irradiating the object with penetrating radiation to cause radiation scattering by these scattering centers, causing periodic vibration of these scattering centers, detecting radiation scattered by the scattering centers in the object along at least two noncongruent detection channels which are at an angle with each other and which intersect at a common volume within the object, and correlating the outputs of the detectors with a frequency parameter of the vibration to derive thereby information of internal physical and mechanical characteristics of the object.

28 Claims, 13 Drawing Figures

PATENTED OCT 30 1973 3,769,507

INVENTORS
ALAN M. JACOBS
EDWARD S. KENNEY
BY Ivan S. Kavrukov
Thomas J. ———
ATTORNEY

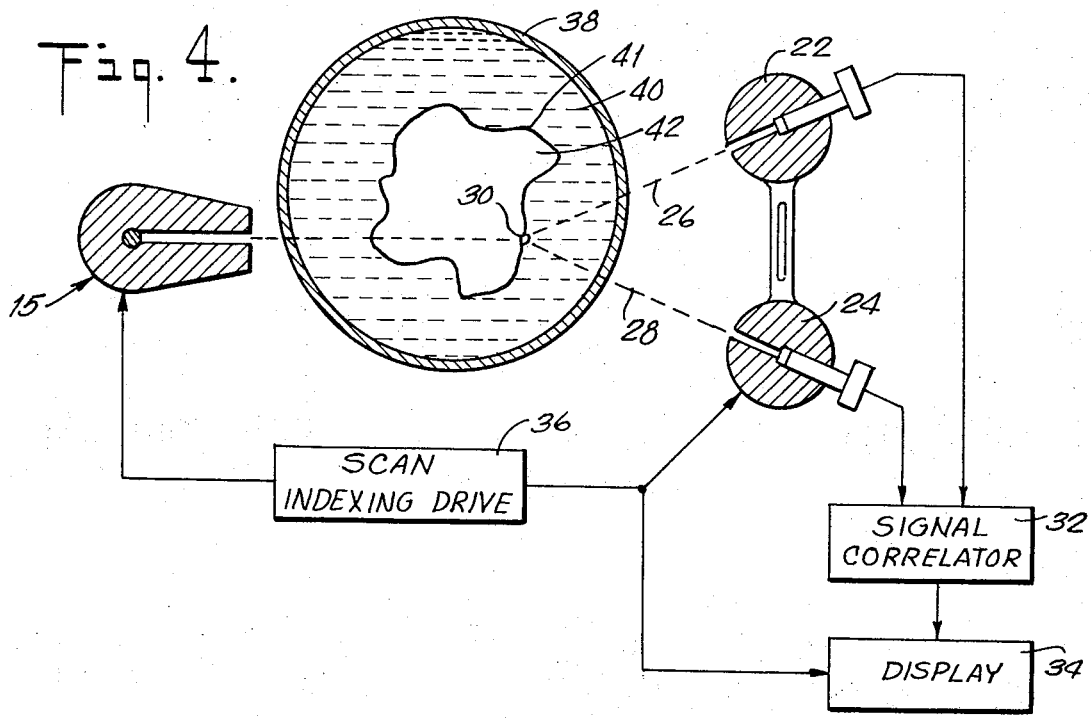
Fig. 4.
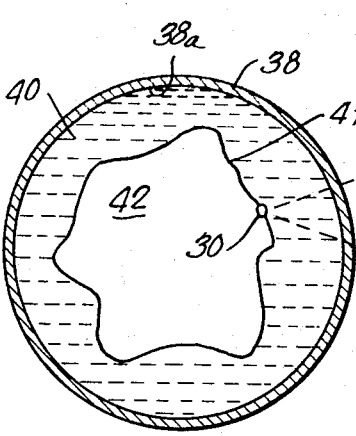
Fig. 5.
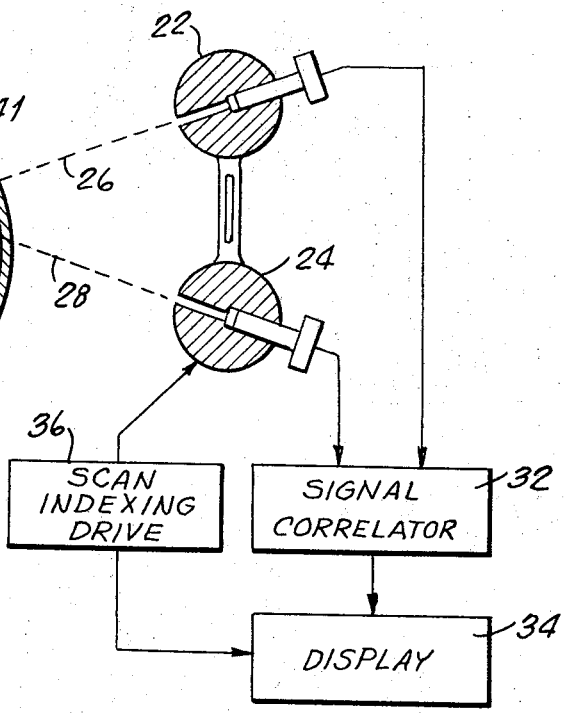

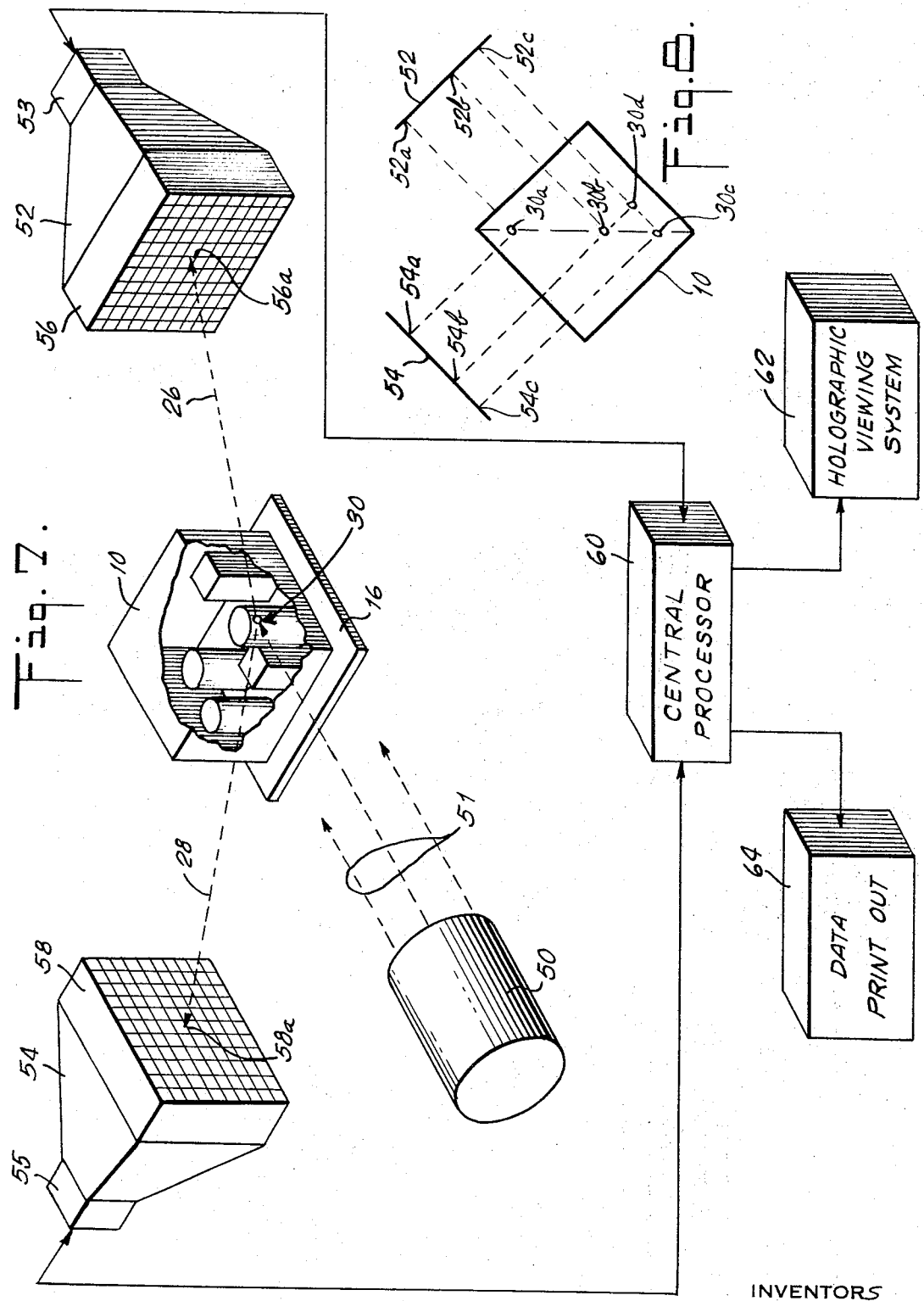

DYNAMIC RADIOGRAPHY

BACKGROUND OF THE INVENTION

The invention is in the field of radiography related to examining objects which are opaque to visible light, but are transparent to certain types of radiation. In particular, the invention relates to dynamic radiography and involves utilizing radiation scattered from the interaction between a radiation field and a phonon field co-existing within an object, and involves utilizing correlative techniques for enhancing desirable parameters of the scattered radiation.

When a beam of radiation, such as X-ray gamma ray radiation neutrons and the like, is transmitted through any heterogeneous object, it is differentially absorbed, depending upon the varying thickness, density and chemical composition of the object. The image registered by the emergent radiation on a photographic film adjacent to the object under examination constitutes a shadowgraph or radiograph of the interior of the object. Among the many objects which are commonly examined by radiography are biological specimens, such as the human chest, human teeth, and major passageways of the human body, and industrial specimens such as metal castings, pipes, plates, complex mechanical devices, rubber tires and welds to detect internal physical discontinuities such as voids, cracks, flaws, segregations, porosities, inclusions and other discontinuities.

The key to conventional radiography is differential absorption of radiation where variations in thickness, density and chemical composition provide differing attenuation for the penetrating radiation. While such variations are well pronounced in many cases and are susceptible to detection by conventional radiography, there are many cases where no significant composition, thickness or density differences exists, as for example in the case of metal castings having hairline cracks which are normal to the penetrating radiation beam, or in the case of many internal organs of the human body. Thus, where no significant thickness density or composition differences exist in an object, conventional radiography can not be used successfully, and the need exists for better methods of examining such objects.

One specific example of the use of conventional penetrating radiation radiography to detect discontinuities in optically opaque objects is disclosed in Bernstein U.S. Pat. No. 3,158,744 where two detectors positioned close to each other look at a beam of hard X-ray radiation which has traversed an optically opaque object. When the beam encounters a discontinuity in the object, differing amounts of penetrating radiation may reach the two detectors. The disclosure in Bernstein is limited to the use of straight line penetrating radiation and no mention is made of use of scattered radiation.

In conventional radiography, scattered radiation, which is radiation traveling in directions other than straight through the object which is being examined, is considered undesirable because it results in fogging and poor definition of the radiograph. Generally, the effects of scattered radiation are minimized by the use of lead screens or diaphragms consisting of a grid of closely spaced parallel lead sheets which cut off side scattering when moved in a position parallel to the plane of the film during exposure.

Scattered radiation has been used, however, for the purposes of determining density and mass of objects. For example, Scherbatskoy, U.S. Pat. No. 2,997,586, discloses the use of measured variations of scattered radiation to determine variations in the density of an object. Kowalczynski, U.S. Pat. No. 3,361,911, shows measuring the mass of an object by detecting scattered radiation; and Martina, U.S. Pat. No. 3,422,264, discloses generation of stereoscopic radiographs by means of irradiating an object with a neutron beam to induce a secondary emission of gamma-ray photons which are detected by two pinhole cameras looking at the object at an angle to each other. The last mentioned three patents do not disclose utilizing a radiation field-phonon field interaction for the purpose of detecting internal physical characteristics of optically opaque objects, and do not solve the problem of deriving satisfactory one, two or three dimensional information of the internal physical characteristics of optically opaque objects in which no significant thickness, density or composition differences exist. There is still a need for obtaining such information, both for industrial uses and for physiological uses.

SUMMARY OF THE INVENTION

The invention is in the field of radiographic examination of objects which are optically opaque. In particular, the invention relates to dynamic radiography which involves detecting and correlating radiation scattered from an object in which an interaction of a radiation field and a phonon field takes place, said detecting and correlating being carried out for the purpose of obtaining one, two, or three-dimensional information about internal physical and mechanical characteristics of the object.

In its broadest aspect, the invention relates to causing a radiation field-phonon field interaction in an object and detecting radiation scattered by scattering centers in the object to generate information indicative of internal physical and mechanical characteristics of the object. The radiation field may be caused, for example, by irradiating the object with radiation such as gamma rays, X-rays, electrons, neutrons, alpha-particles, or the like; and the phonon field may be caused, for example, by vibrating the object at a sonic frequency by causing other types of phonon perturbations or by relying on naturally existing perturbations. When two detectors look at the object along two detection channels intersecting at a common volume in the object, and when the object is continuous at that common volume, the motion of scattering centers in that volume is uniform; therefore the detections of scattered radiation along the two detection channels result in two statistically independent variables which have low cross-correlation. If, however, a discontinuity exists within the common volume at which the two detectors are looking, a discrete step in the amount of scattering occurs within that volume, and the scattering detected along the two detection channels undergoes a common change keyed to the phonon field perturbations. When the outputs of the two detectors are cross-correlated under such conditions, the common characteristics of the two outputs at the time each of the two detectors sees the discontinuity (i.e., the phonon field perturbations) results in high cross-correlation between the two outputs. Thus, low cross-correlation means that the object is continuous at the point where the two detectors are looking, and high cross-correlation means that there is a discontinuity at the common point at which the two detectors are looking.

A single detector of scattered radiation may be used, instead of the two detectors described above, if only one-dimensional or two-dimensional information about the internal physical and mechanical characteristics of the object is desired.

The object under dynamic radiography examination may be scanned by establishing suitable relative motion between the object and the detectors, or by imaging the objects by means of scattered radiation on detection screens. These detection screens may feed video scanning system cameras which are synchronized in their scan patterns to accept data in sequence from the entire object of from a portion of the object. Selected pairs of points of the two images on the two detection screens identify two intersecting narrow beams of scattered radiation which originate from a common volume in the object.

An important property of a dynamic radiograph generated as disclosed in this specification is the fact that it can reflect the mechanical response of the object to the phonon field perturbations. This aspect of dynamic radiography is particularly important in medical uses, such as, for example, diagnosing pulmonary and blood circulation conditions.

A particular embodiment of the invention comprises: means for irradiating the object to cause radiation scattering by scattering centers in the object, as for example by using an external source to irradiate the object or by mixing a radioactive tracer in the object; means for causing displacement of object scattering centers with respect to the radiation, as for example by vibrating the object or by otherwise causing a phonon field in the object; detecting means for obtaining a measure of the radiation scattered by the object in each of two different detection channels, as for example, by using a pair of scintillation detectors or by using a pair of detection screens; and means for correlating the measures of radiation in the two channels, as for example, by using a conventional correlator connected to the outputs of the two channels. The standard correlator may include as a third input the frequency for the means of vibrating the object; and, the object may be scanned to obtain three-dimensional information of its internal characteristics. A single detector may be used if three-dimensional information is not essential.

The invention provides highly improved resolution in cases where conventional radiography may also be used, and provides one, two or three-dimensional information of objects which may not be examined by conventional radiography. For example, the invented dynamic radiography may be used for physiological examinations of organs which do not provide sufficient radiation attenuation contrast and therefor cannot be conveniently examined by conventional radiography, and may be used to detect defects in industrial objects such as castings, etc. which defects are so small with respect to the object size that they cannot provide attenuation contrast detectable by conventional radiography.

BRIEF DESCRIPTION OF THE DRAWINGS

FIG. 4 illustrates the use of the dynamic radiography system of FIG. 1 for examining an object having a naturally occurring phonon field.

FIG. 5 illustrates a system for dynamic radiography of an object which includes a radioactive tracer.

FIG. 7 illustrates a dynamic radiography system utilizing detection screens and electronic scanning of the object by means of scanning the image on the detection screens.

FIG. 8 is an illustration of the principles involves in the scanning carried out by the system of FIG. 7.

DETAILED DESCRIPTION

Figure 1:
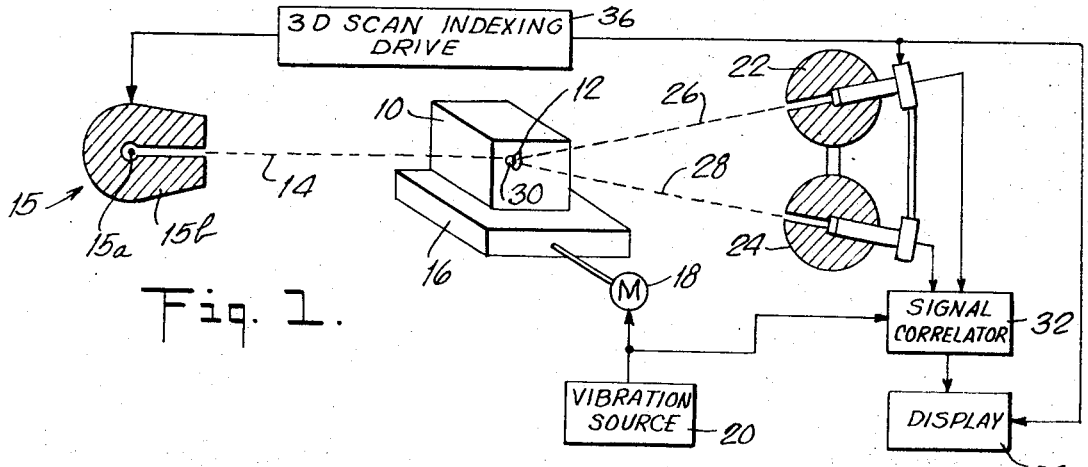
FIG. 1 is a schematic illustration of a dynamic radiography system for examining an optically opaque object by detecting radiation scattered along two detection channels at an angle to each other.

The basic principles of using a radiation field-phonon field interaction and of correlating scattered radiation parameters and phonon field parameters to obtain three-dimensional information about the internal physical or mechanical characteristics of optically opaque objects are illustrated in the exemplary embodiment of FIG. 1 which shows the examination of an object 10 containing an internal flaw 12. A radiation field is established in a portion of the object 10 by means of a radiation beam 14 generated by a suitably collimated radiation source 15. A phonon field is established in the object 10 by means of a vibrator 16 driven by a motor 18 energized to cause sonic frequency vibration under the control of a vibration source 20. Radiation scattered by the object 10 is detected by means of two detectors 22 and 24 which are suitably collimated to receive scattered radiation along detection channels 26 and 28 respectively which intersect at a common volume 30 which is inside the object 10 and is on the beam 14 from the radiation source 15. The signals from the detectors 22 and 24 and the signal from the vibration source 20 are correlated by a signal correlator 32, and the output of the correlator 32 is displayed at a display 34.

The radiation source 15 may be a conventional X-ray source 15a having a suitable level output, but may alternately be a source of other radiation that may be compatible with the object 10, such as neutron, gamma ray, electron, alpha-particle or other radiation capable of causing scattered radiation in at least a portion of the object 10. The radiation source 15a is suitably collimated by a collimator 15b to emit a narrow beam 14. The vibrator 16 may be a conventional shaking table capable of vibrating the object 10 at sonic frequency, for example, at frequencies in the range of between ½ Hertz and 1,000 Hertz at up to one millimeter excursion when suitably driven by the motor 18. The vibration source 20 may be a suitably amplified audio oscillator. The detectors 22 and 24 may be conventional photomultiplier scintillation crystal units combined with integration networks to provide a current suitably proportional to the average detection rate of scattering events. The signal correlator 32 may be a standard analogue device for carrying out correlation, such as cross-correlation, of the signals from the detectors 22 and 24 and the audio frequency signal from the vibration source 20. The display 34 may be a conventional XY plotter which plots the output of the signal correlator 32 on an XY coordinate system representing the volume 30 with respect to a plane in the object 10.

In operation, the radiation source 15 generates a narrow beam 14 of penetrating radiation which impinges on and penetrates the object 10 at least through the finite common volume 30 at which the detector channels 26 and 28 intersect. Interaction between incident radiation from the radiation source 15 and scattering centers in the volume 30 results in the generation of scattered radiation emitted from the volume 30. Some of this scattered radiation is emitted along the detection channel 26 and is detected by the detector 22, and some is emitted along the detection channel 28 and is detected by the detector 24. Since the two detection channels are at an angle to each other, each detector detects scattering events which are independent of the scattering events detected by the other detector. Thus, if the finite volume 30 encloses only a homogenous collection of scattering centers, each detector will detect a series of scattering events independent of the series of scattering events detected by the other detector. The output of each detector includes, in addition to the signal resulting from scattering events, a noise component which is also statistically independent of the noise component in the signal from the other detector.

Thus, if the two detectors 22 and 24 are looking at a common volume 30 which includes only a continuous and homogenous distribution of scattering centers, the outputs of the two detectors are statistically independent and a cross-correlation of the outputs of the two detectors, which cross-correlation serves as a measure of the dependence between two statistical variables, has a low value.

If the collection of scattering centers in the finite volume 30 undergoes some phonon perturbation, such as if the collection of scattering centers within the volume 30 is vibrated with respect to the beam 14 from the radiation source 15, and if there is no discontinuity of scattering centers in the volume 30, the phonon perturbation causes continuous motion of scattering centers, and the scattering probability does not change due to the phonon field.

If, however, there is a discontinuity within the finite volume 30, such as if the finite volume 30 includes a wall separating solid metal from an air bubble, and if the metal is vibrated such that the wall between the air bubble and the solid metal jumps in and out of the finite volume 30, the frequency of vibration shows in the outputs of the detectors 22 and 24 because of the difference in scattering probability between the time when the common volume 30 includes only solid metal and the time when the common volume 30 includes part solid metal and part air bubble. Under such conditions, the outputs of the detectors 22 and 24 are no longer statistically independent, but have a common characteristic, namely, a change in detected scattering events keyed to the frequency of vibrating the material within the common volume 30. A cross-correlation of the outputs of the detectors 22 and 24 and of a signal representing the phonon field frequency has a high value because it is a measure of the interdependence of the correlated signals.

Figure 2A:
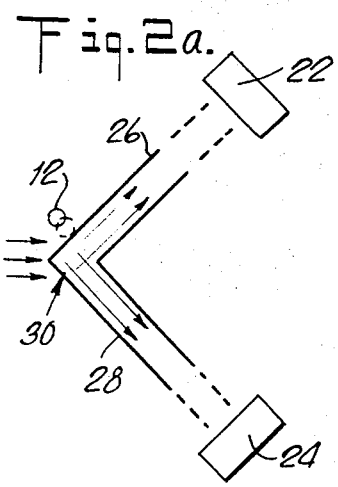
FIGS. 2a, 2b, and 2c are diagrammatic illustrations of the detection channels in different relative positions to a discontinuity within the object under radiographic examination.
Figure 2B:
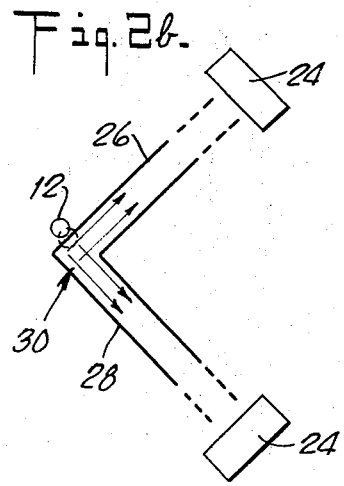
Figure 2C:
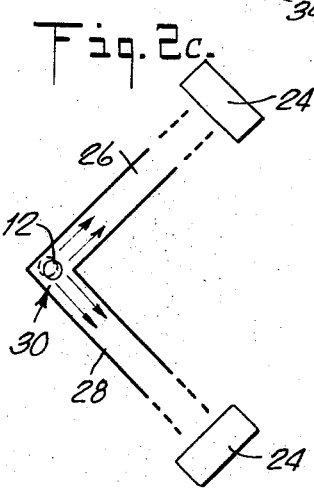
Figure 3A:
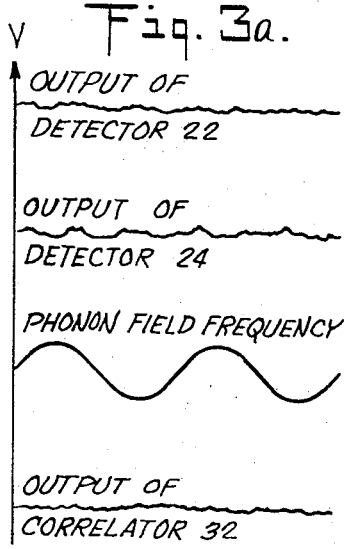
FIGS. 3a, 3b, and 3c illustrate the outputs of components of the system of FIG. 1 under the conditions illustrated in FIGS. 2a, 2b, and 2c respectively.
Figure 3B:
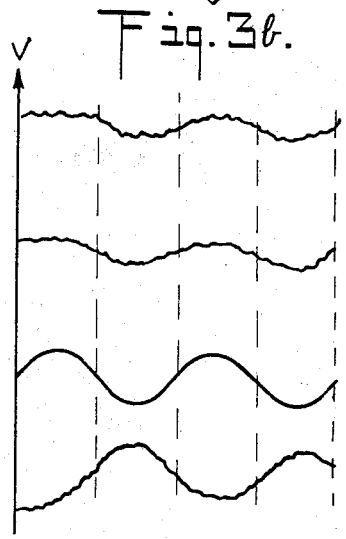
Figure 3C:
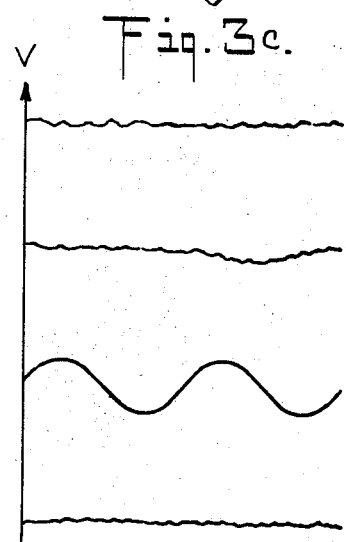

For a qualitative explanation of detecting a discontinuity, such as an air bubble, in the object 10, reference is made to FIGS. 2a, 2b and 2c which show a partial sectional view through FIG. 1 taken along the axis of the detection channels 26, 28 and to FIGS. 3a, 3b, and 3c which show the outputs of the detectors 22 and 24, the phonon field frequency and the output of the correlator 32 under the conditions of FIGS. 2a, 2b and 2c respectively.

Referring to FIG. 2a, assume that the object 10 is a metal block, that the common volume 30 at which the two detectors 22 and 24 look includes only solid, homogenous and continuous metal and that the flaw 12 is an air bubble which is just outside the common volume 30. Further assume that the air bubble 12 moves due to the phonon field excitation of the object 10 between two extreme positions : the position shown as a solid line circle and the position shown as a broken line circle, and that in each position, the air bubble is completely outside the common volume 30. Assume that the solid line circle corresponds to the positive peak of the phonon field frequency curve shown in FIG. 3a and the broken line circle representation of the air bubble 12 corresponds to the negative peak of the phonon field frequency curve. Since the common volume 30 contains no discontinuities, the outputs of the detectors 22 and 24 each include a component resulting from detected scattering events and a component resulting from noise. The two components of the signal output from the detectors 22 are statistically independent of the two components output from the detector 24. Therefor, the output of the correlator 32 is essentially a flat zero signal. The fact that the scattering centers within the common volume 30 move with respect to the detection channels 26 and 28 has no effect on the correlation between the signal output of the detectors 22 and 24.

Referring to FIG. 2b, assume that the phonon field exciting the object 10 moves the air bubble 12 from a position just outside the common volume 30 to a position partly inside the common volume 30, and that the position outside the common volume 30 (shown as a solid line circle) corresponds to the positive peak of the phonon field frequency curve and the position partly inside the common volume 30 (shown as a broken circle) corresponds to the negative peak of the phonon field frequency curve shown in FIG. 3b. When the air bubble 12 is outside the common volume 30, the situation is the same as that described in connection with FIGS. 2a and 3a, namely, the outputs of the detectors 22 and 24 are statistically independent, and the output of the correlator 32 is essentially zero. When the air bubble 12 enters the common volume 30 due to the phonon field excitation of the object 10, the scattering probability starts undergoing a change due to the change in the composition of the common volume 30. If the air bubble 12 generates less scattering than the surrounding metal, then the output of the detectors 22 and 24 starts dropping and continues dropping as more of the air bubble 12 goes into the common volume 30 due to the phonon field excitation of the object 10. When the air bubble 12 is furthest into the common volume 30, at the negative peak of the phonon field frequency curve, the outputs of the detectors 22 and 24 are concurrently at their lowest value, and the output of the correlator 32, which carries out a cross-correlation function, is at its peak because it is a measure of the likeness between the outputs of the detectors 22 and 24 and the phonon field frequency curve. When the air bubble 12 starts returning toward its position outside the common volume 30, the order of events is reversed, and when the bubble 12 is completely outside the common volume 30, the situation reverts to that described in connection with FIGS. 2a and 3a when the outputs of the detectors 22 and 24 are statistically independent and the correlation therebetween is essentially zero. As the next negative portion of the phonon field frequency curve starts, the cycle of events is repeated and the output of the correlator 32 again starts going high.

As a third situation, assume that the air bubble 12 is completely inside the common volume 30 at which the two detectors 22 and 24 look, and that the phonon field which excites the object 10 moves the air bubble 12 only through positions completely inside the volume 30. Now the phonon field causes no change in the consistency of the common volume 30 and the outputs of the two detectors 22 and 24 are again statistically independent, just as in the case of the situation described in connection with FIGS. 2a and 3a.

It is noted that correlation operations other than cross-correlation may be useful. For example, simple signal averaging, or a measuring of AC signal voltage may be useful in utilizing dynamic radiography. In one example where X-ray radiation has been scattered from two-phase water-air flow in a vertical pipe, the AC signal voltage has been found to be a good indication of the quantity of air injected into the water flow.

The object 10 may be scanned by the common volume 30 at which the detectors 22 and 24 look simultaneously by establishing a relative scanning motion between, on the one hand the object 10, and on the other hand, the combination of the radiation source 15 and the detectors 22 and 24. For example, a three dimensional scan indexing drive 36 may be used to drive the combination of the radiation source 15 and the detectors 22 and 24 such that the object 10 is examined slice by slice and the output of the correlator 32 is displayed on the display 34 as a series of successive XY plots of the internal physical and mechanical characteristics of successive slices. For example, a rectilinear scan may be started by positioning the common volume 30 at which the detection channels 26 and 28 and the radiation beam 14 intersect at one corner of the object 10 and then moving that common volume 30 rectilinearly to scan along coplanar successive lines of a slice of the object 10 parallel to a side thereof, and then moving on to a next slice parallel to the first one until the entire volume of the object 10 is scanned in that fashion. When, in the course of scanning, the common volume 30 approaches a flaw 12, the situation resembles that explained in connection with FIGS. 2a and 3a. When the common volume 30 moves closer to the flaw 12 and the flaw 12 starts moving in and out of the common volume 30 as the object 10 is vibrated, the situation resembles that explained in connection with FIGS. 2b and 3b. If the flaw 12 is small enough to be completely included within the volume 30, as shown in FIG. 3c, the situation resembles that described in connection with FIGS. 2c and 3c. As the flaw 12 starts moving out of the common volume 30, again signals similar to those shown in FIG. 3b appear at the outputs of the detectors 22 and 24 and of the correlator 32.

If the display 34 (FIG. 1) is an XY plot of the scanning pattern of a slice of the object 10, with a scan line of the display 34 corresponding to a scan line through the slice of the object 10, and if the output of the correlator 32 is used to intensity-modulate the scan lines on the display 34, then the display 34 may be a light surface except for dark spots corresponding to a high output of the correlator 32 which in turn correspond to discontinuities in the object 10. The position of the discontinuity within the object 10 is uniquely determined three dimensionally by the intersection of the detection channels 26 and 28. Note that the display 34 is synchronized with the scan indexing drive 36 to establish a unique one-to-one correspondence between a position of the common volume 30 within the object 10 and a point displayed on a particular X-Y plot of the display 34.

It is noted that scan speed is related to the necessary detection time for producing usable signals in response to detected scattered radiation. As one example, for the mechanical scan system described above, scanning speeds of the order of one millimeter per minute to 10 centimeters per second may be useful.

There is a defined relationship between the radiation field density, the phonon field frequency, the scan speed and resolution. For example, for a given radiation field density, the upper limit of phonon field frequency is reached when a cycle can not be resolved with the available scattered and detected events. The number of scattered and detected events needed to resolve a cycle is of the order of one hundred. For diagnostic X-ray apparatus utilizing dynamic radiography, phonon field frequencies of up to 1,000 Hz may be usable. Resolution depends primarily on the collimator aperture. The amplitude of the displacement of scattering centers (due to the phonon field) with respect to the detection channels is an important factor. If the amplitude is too large, the resulting image is diffused; if the amplitude is too small, it may be difficult to observe the fluctuations in scattered radiation field amplitude.

If the object which is to be examined by dynamic radiography is naturally under the effect of a phonon field, it is unnecessary to induce therein additional phonon fields as described in connection with FIG. 1. One example of a naturally existing phonon field is illustrated in FIG. 4 which shows in cross section a pipe carrying a two-phase turbulent flow containing a liquid phase 40 and a gas phase 42. Components of the apparatus shown in FIG. 4 which are like components of the apparatus of FIG. 1 are designated by like reference numerals. When the common volume 30 at which the detectors 22 and 24 look is entirely within the liquid phase 40, at all times phonon field perturbations (causing motion of the liquid-gas interface 41) have no effect on the statistical independence between the outputs of the detectors 22 and 24, and the output of the signal correlator 32 which carries out cross-correlation is essentially zero. Similarly, when the common volume 30 is entirely within the gas phase 42, at all times phonon field perturbations of the gas phase have no effect on the statistical independence between the outputs of the detectors 22 and 24, and the output of the signal correlator 32 is again essentially zero. When, however, the common volume 30 includes the interface 41 between the liquid phase 40 and the gas phase 42, motion of the interface 41 with respect to the common volume 30 due to the phonon perturbations resulting from the turbulent flow cause a common change in the scattering events detected by the detectors 22 and 24, and this common change is detected by the signal correlator 32 which generates a signal different from zero, because of detector output cross-correlation similar to that shown in FIG. 3b, but without the periodicity due to vibrational phonon field. The system comprising the liquid phase 40 and the gas phase 42 may be scanned by the common volume 30 by utilizing a scan indexing drive 36 to cause a two dimensional scan, in the plane of FIG. 4 of the cross-section of the pipe 38. The display 34 is synchronized with the scan indexing drive 36 to represent the cross-section of the pipe 38 shown in FIG. 4 by showing a blank area for each of the liquid phase 40 and the gas phase 42 and showing a dark line for the interface 41.

In case the object 10 which is examined by dynamic radiography contains a radioactive tracer, an external source of radiation, such as the source 15 (FIG. 1 and 4) may be unnecessary. One example of a system in which a radioactive tracer is relied on for generating emission of radiation and scattering events is illustrated in FIG. 5 which shows a system identical to that shown in FIG. 4 except that there is no external radiation source 15, and either the gas phase 42, or the liquid phase 40, or both, contain a radioactive tracer which emits radiation resulting in scattering events. As in the apparatus of FIG. 4, when the common volume 30 in FIG. 5 contains only homogenous gas phase at all times, the scattered and emitted events detected by the detectors 22 and 24 are statistically independent; therefore the outputs of the detectors 22 and 24 are two statistically independent variables and the output of the signal correlator 32 is essentially zero. Similarly, when the common volume 30 includes only homogenous liquid of the liquid phase 40, the outputs of the detectors 22 and 24 are two statistically independent variables and the output of the signal correlator 32 is again essentially zero. When, however, the common volume 30 includes the interface 41 between the liquid phase 40 and the gas phase 42, the perturbations due to the turbulent flow cause variation in the scattering and emission characteristics of scattering centers within the volume 30 with respect to the volume 30. These phonon field perturbations affect simultaneously and similarly each of the detectors 22 and 24. The detected perturbations of the phonon field introduce a common characteristic into the outputs of the detectors 22 and 24, namely, the effects of the phonon field perturbation on scattering centers and hence on scattering events detected by each of the detectors 22 and 24.

Thus, when the common volume 30 at which the detectors 22 and 24 look simultaneously includes the interface 41 between the liquid phase 40 and gas phase 42, the output of the signal correlator 32 is high, while when the common volume 30 includes either only the gas phase 42 or only the liquid phase 40, the output of the correlator 42 is low. The shown cross-section of the pipe 38 may be scanned by means of a scan indexing drive 36 which is synchronized with the display 34 such that the display 34 shows a plot of the cross section scanned by the common volume 30. Any convenient scanning pattern may be used, such as a rectilinear scan similar to the manner in which a television tube screen is scanned, or a polar-coordinate scan. The display 34 is scanned in the same manner in which the shown cross section of the pipe 38 is scanned. The scan lines on the display 34 may be intensity-modulated by the output of the signal correlator 32 such that low level signals from the correlator 32 result in lightly traced lines on the display 34 and high level signals from the correlator 32 result in heavily traced lines on the display 34. Under such condition, the image displayed on the display 34 is a reproduction of the interface 41 between the liquid phase 40 and the gas phase 42. If the interface between the liquid phase 40 and the pipe inner face 38a is included in the scan pattern of the scan indexing drive 36, then the display 34 would also show a circle corresponding to that inner face 38a.

Figure 6:
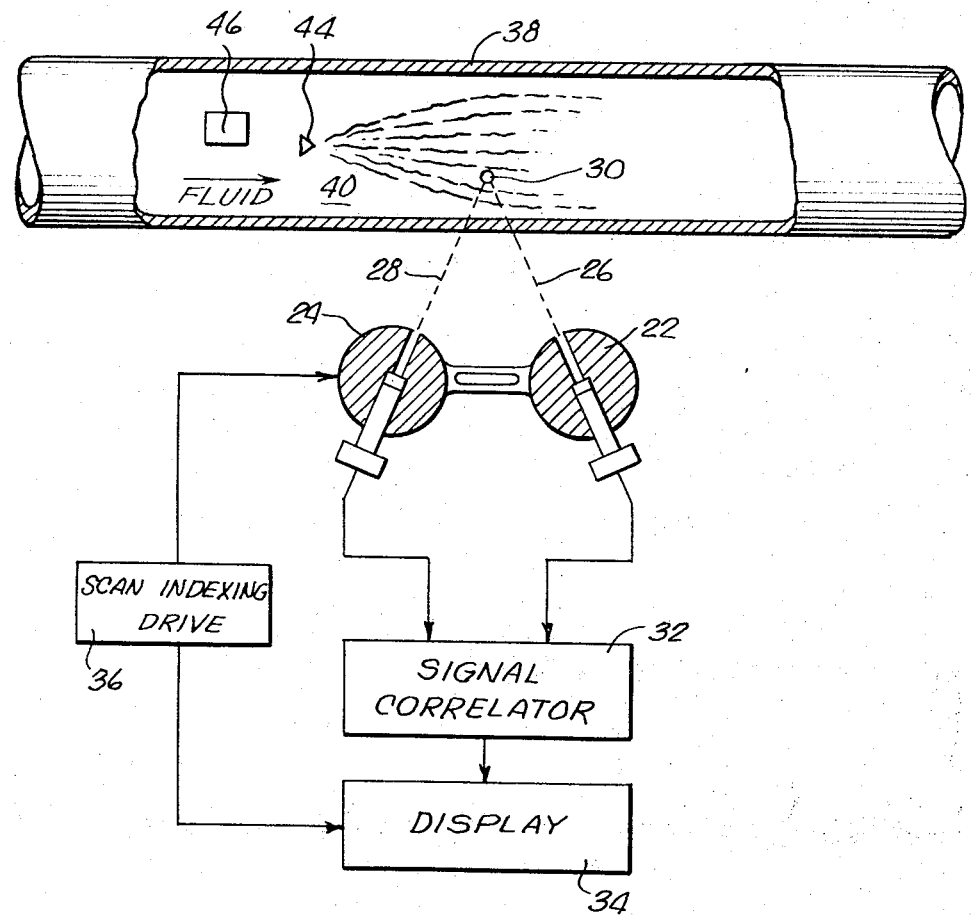
FIG. 6 illustrates the use of a dynamic radiography system for providing time history of a diffusing process.

In addition to detecting discontinuities of the type described in connection with FIGS. 1, 4 and 5, dynamic radiography may be used to provide information of the time history of processes such as, for example, diffusion processes. An illustration of such use is shown in FIG. 6 where a conduit such as a pipe 38 contains a fluid 40 flowing in the indicated direction and a diffusing material source 44 which diffuses into the fluid 40 a diffusion material containing a radiographic tracer. If the common volume 30 at which the detection channels 26 and 28 of the detectors 22 and 24 respectively intersect is held stationary with respect to the conduit 38, then the motion of the diffusion process provides, at the outputs of the detectors 22 and 24, a common signal component which is correlated by the signal correlator 32 and, when displayed on the display 34 as a function of time, provides a time history of the diffusion process. Alternately, a periodic phonon field may be generated by a sonic frequency oscillator 46 vibrating within the fluid 40 and mechanically coupled therewith to cause displacement of scattering centers within the fluid 40 with respect to the common volume 30. A scan of the fluid 40 may be effected by causing relative motion between the common volume 30 at which the two detectors 22 and 24 look and the conduit 38 by means of a scan indexing drive 36 scanning the conduit 38 in a suitable pattern and synchronized with the display 34 for the purpose of establishing a one-to-one correspondence between points inside the conduit 38 and points on the display 34.

In order to scan rapidly an object under dynamic radiography, the mechanical scanning of the object described in connection with FIGS. 1, 4, 5 and 6 may be replaced by electronic scanning as illustrated in the exemplary embodiment of FIG. 7. In electronic scanning, a source of radiation is kept fixed with respect to the object under examination and the object is imaged by scattered radiation on a detection system comprising detection screens coupled to image intensifiers. The detection system is viewed by video cameras to accomplish scanning. The object is swept in three-dimensional format. The scattered radiation by which the object is imaged on the detection system is collimated for the purpose of identifying the origin of scattered radiation from each point of the object. The scans are synchronized to interrogate each point inside the object in its turn.

Referring to FIG. 7, the object 10 is irradiated by means of a radiation source 50 which generates not a narrow beam of radiation as the radiation source 15 described earlier, but a wide beam 51 which irradiates either the entire object 10 or a substantial portion thereof. If the object 10 is not naturally under the effects of a phonon field, a phonon field may be introduced by means of a vibrator 16 or by other suitable means. The radiation beam 51 from the radiation source 50 interacts with scattering centers in the object 10, and the scattered radiation is detected simultaneously by a detection system 52 collimated by means of a dynamic collimator 56 known in the art as a Bucky Plate, and by a detection system 54 collimated by a Bucky Plate 58. Each of the Bucky Plates 56 and 58 comprises a grid of perforations and allows scattered radiation to reach the image intensifiers only through the perforations. A pair of perforations, one on each Bucky plate, defines two detection channels intersecting at a common small volume within the object 10. For example, the pair of perforations 56a in the Bucky plate 56 and 58a in the Bucky plate 58 define respectively a detection channel 26 and a detection channel 28 which intersect in a common volume 30 in the object 10. Scattered radiation along the detection channel 26 passes through the perforation 56a in the Bucky plate 56 and is imaged on a defined point on the detection system 52. Similarly, scattered radiation along the detection channel 28 passes through the perforation 58a on the Bucky plate 58 and is imaged on a defined point on the detection system 54. These two defined points on the image intensifiers 52 and 54 constitute a selected pair of points, each measuring radiation scattered by the common volume 30 within the object 10. Other selected pairs of points, one point from each of the image intensifiers 52 and 54, constitute a measure of the radiation emitted from different defined common volumes 30 within the object 10. If the entire object 10 is imaged on each of the detection system 52 and 54, then any small common volume 30 within the object 10 is defined by a selected pair of points, one from each of the image intensifiers 52 and 54, and a one, two or three-dimensional scan of the object 10 may be carried out by simultaneously scanning each of the detection systems 52 and 54 two dimensionally in suitable synchronism by means of conventional video cameras 53 and 55 respectively.

For an illustration of scanning the object 10 by electronically scanning the image intensifiers 52 and 54, reference is made to FIG. 8 which shows diagramatically a partial sectional view of an image on the detection systems 52 and 54 and of the object 10 viewed from the top of the object 10 in FIG. 7. Assume that the entire object 10 is irradiated and that the entire object 10 is imaged by scattered radiation on each of the detection systems 52 and 54. Then, the radiation scattered by a common volume 30a is defined by a selected pair of points 52a and 54a on the detection systems 52 and 54 respectively; the radiation scattered by a common volume 30b is defined by points 52b and 54b on the detection systems 52 and 54 respectively; and the radiation scattered by still another common volume 30c is defined by points 52c and 54c on the detection systems 52 and 54 respectively. When the detection systems 52 and 54 are scanned electronically such that a simultaneous reading is obtained from the selected pair of points 52a and 54a; from the selected pair of points 52b and 54b and from the selected pair of points 52c and 54c, the result is a simulation of scanning the object 10 along the line connecting the common volumes 30a, 30b and 30c and obtaining readings at the locations of the common volumes 30a, 30b and 30c. If readings are obtained from points on the detection system image which are closer together, then a substantially continuous scan of the object is effected. By introducing suitable delays in the scan patterns of scanning the detection systems 52 and 54, by means of conventional video camera techniques, the common volume defined by a selected pair of points on the detection system image can be moved anywhere within the plane defined by the points shown on the detection systems 52 and 54. For example, the common volume designated 30d is examined by scanning such that points 52c and 54b are read out simultaneously.

The detection systems 52 and 54 are scanned by the video cameras 53 and 55 respectively under the control of a suitably programmed central processor 60 for properly correlating selected pairs of points of the detection system images and for extracting desired information therefrom. The output of the central processor 60 may be utilized by a data printout to show the location of discontinuities within the object 10 and by a holographic viewing system 62 which may represent a three-dimensional image of discontinuities within the object 10.

Figure 9:
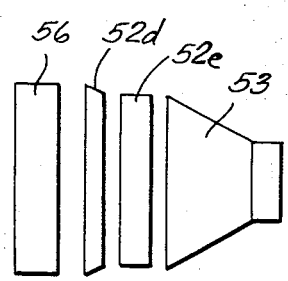
FIG. 9 is a schematic blown up illustration of a detection system forming a part of the embodiment of FIG. 7.

Referring to FIG. 9, the detection system 52 includes a detection screen 52d which detects scattered radiation collimated by the Bucky Plate 56 and image intensifiers 52e. The detection screen 52d and the image intensifiers 52e are scanned electronically by a conventional video camera 53 in a conventional rectangular raster pattern, or in a different pattern that may be chosen by the central processor 60. The detection system 54 is similarly constructed and positioned. The scan patterns and the pattern timing of the video cameras 53 and 55 are synchronized such that any plane within the object 10 may be scanned by choosing suitable time delays between the scan beams of the video cameras. Alternately, the scan information may be digitized and stored in the memory of the central processor 60, and a view of a selected point, plane, or volume of the object 10 may be generated by suitably extracting portions of the stored digitized information.

It is noted that the use of a single detector may be satisfactory in some applications of dynamic radiography. For example, a single detector 22 may be used in the embodiments of FIGS. 4 and 5 to examine two-phase flow, or in the embodiment of FIG. 6 to examine a diffusion process. Of course, three-dimensional information is not generated, rather an average weighted by radiation transport probabilities is detected by the single detector. Examples of uses of a dynamic radiography systems having only a single detector include: steam quality monitoring, airborne particulate monitoring, product size monitoring in crushing or other bulk forming operations, and liquid-solid, liquid-gaseous, or solid-gaseous mixture measurements or interface motion.

An important aspect of dynamic radiography is the contrast developed by varying amplitude of mechanical vibration response of the object. As one example, one medical use of dynamic radiography is the detection of lung and lung passageway disease. Certain pulmonary disorders result in changed mechanical properties of lung tissue, and certain such changes may provide contrasts in the intensity of dynamic radiographs of lung walls. Similar situations exist for certain coronary-arterial disorders. Dynamic radiography provides detection capabilities not only for parameters such as physical discontinuities within an optically opaque object, but also for changes in the mechanical response of an object to phonon fields.

What is claimed is:

1. Apparatus for examining an optically opaque object containing penetrating radiation scattering centers, comprising:
   a. means for irradiating the object with penetrating radiation to cause radiation scattering by scattering centers in the object;
   b. means for causing periodic vibration of said scattering centers within the object;
   c. means for detecting radiation scattered by scattering centers in the object along at least two noncongruent detection channels which are at an angle with each other and which intersect at a common volume within the object; and
   d. means for correlating information generated by said detecting means in response to detected scattered radiation with information representing the periodic vibration of said scattering centers within the object to derive thereby information of internal physical and mechanical characteristics of the object.

2. Apparatus as in claim 1 including means for causing a scan of the object by said common volume.

3. Apparatus as in claim 2 wherein said scan causing means comprise means for causing relative motion between the detection means and the object.

4. Apparatus as in claim 3 wherein said relative motion between the detecting means and the object is along a defined scanning pattern.

5. Apparatus as in claim 1 wherein the detecting means comprise two detection systems each providing an image of the radiation scatteed from at least a portion of the object along one of the two directions defined by said detection channels, with selected pairs of points, one on each detection system image, defining radiation scattered from a common volume of the object.

6. Apparatus as in claim 5 including means for scanning the object comprising means for successively examining different selected pairs of points on the detection system images to simulate a scan of the object.

7. Apparatus as in claim 6 wherein the correlating means include means for correlating parameters of the selected pairs of points with the vibrating means to enhance differences between different pairs of points.

8. Apparatus as in claim 7 wherein the scanning means include video camera means for electronically scanning the detection system images in a synchronism simulating a scan of the object.

9. Apparatus as in claim 1 wherein the irradiating means comprise a radiation source located outside the object and generating a radiation beam impinging on, and at least partly penetrating the object.

10. Apparatus as in claim 1 wherein the irradiating means comprise a radiation source located within the object and generating a radiation beam.

11. Apparatus as in claim 1 wherein the irradiating means comprise radioactive material interspersed with said scattering centers in the object.

12. Apparatus as in claim 1 wherein the detection means comprise two detectors each responsive to scattered radiation along a different one of said detection channels and generating an output signal representative of detected scattered radiation, and wherein the correlating means comprise means for receiving as input signals the outputs of the two detectors and a signal representative of a frequency parameter of the vibrating means and for generating a correlated output signal enhancing the similarities between the three input signals.

13. Apparatus as in claim 12 wherein the correlating means is a cross-correlator.

14. Apparatus as in claim 1 wherein the detecting means comprise two detection systems each having a screen imaging scattered radiation along a different one of said two detection channels and each comprising a dynamic collimator having a grid of openings each passing a scattered radiation beam along a portion of the associated detection channel, with pairs of selected openings, one from each detection system, defining a common volume within the object, and with each opening defining an image point on the detection system screen.

15. Apparatus as in claim 14 including means for scanning the detection system image screens to simulate a scan of the object.

16. Apparatus as in claim 15 wherein the scanning means include means for simulating a three-dimensional scan of the object.

17. Apparatus as in claim 15 wherein each of the detection systems includes an image intensifier forming said image screen and wherein each detection system includes a video camera for electronically scanning said image screens to simulate a scan of the object.

18. Apparatus as in claim 17 wherein said scanning means include means for simulating a three-dimensional scan of the object.

19. Method of examining an optically opaque object containing penetrating radiation scattering centers, comprising the steps of:
   a. irradiating the object with penetrating radiation to cause radiation scattering by scattering centers in the object;
   b. causing periodic vibration of said scattering centers within the object;
   c. detecting radiation scattered by scattering centers in the object along at least two noncongruent detection channels which are at an angle with each other and which intersect at a common volume within the object; and
   d. correlating information generated by said detecting means in response to detected scattered radiation with information representing the periodic vibration of the scattering centers within the object to derive thereby information of internal physical and mechanical characteristics of the object.

20. Method as in claim 19 including the step of scanning the object by the common volume at which the two detection channels intersect.

21. Method as in claim 20 wherein said scanning is carried out by causing relative motion between the detection means and the object.

22. Method as in claim 19 wherein the detecting step includes imaging radiation along each of said detection channels to provide thereby a pair of screen images, each screen image representing radiation scattered along one of said detection channels and each having a plurality of points representing radiation scattered along portions of the detection channel, with selected pairs of points, one on each screen, defining radiation scattered from a common volume of the object.

23. Method as in claim 22 including the step of successively examining different selected pairs of points of the screens to simulate a scan of the object.

24. Method as in claim 23 wherein the correlating step includes correlating parameters of the selected pairs of points with the vibrating to enhance differences between different pairs of points.

25. Method of examining an optically opaque object which contains penetrating radiation scattering centers undergoing periodic vibrational motion, comprising the steps of:
   a. irradiating the object with penetrating radiation to cause radiation scattering by said periodically vibrating scattering centers in the object;
   b. detecting radiation scattered by scattering centers in the object along at least two noncongruent detection channels which are at an angle with each other and which intersect at a common volume within the object; and
   c. correlating information generated by said detecting means in response to detected scattered radiation with information representing the periodic vibration of the scattering centers within the object to derive thereby information of internal physical and mechanical characteristics of the object.

26. Method as in claim 25, including the step of causing a scan of the object by said common volume.

27. Method as in claim 25 wherein the detecting step includes imaging on image screens radiation scattered along each of said detection channels, with selected pairs of points, one on each detection image screen defining radiation scattered from a common volume of the object.

28. Method as in claim 21 including the step of scanning the object by successively examining different selected pairs of points on the image screen to simulate a scan of the object.

\* \* \* \* \*